United States Patent [19]

Karow

[11] Patent Number: 5,398,306
[45] Date of Patent: Mar. 14, 1995

[54] GENERATION OF MULTITYPE FONTS ON HIGH RESOLUTION OUTPUT DEVICES

[75] Inventor: Peter Karow, Hamburg, Germany

[73] Assignee: URW Software & Type GmbH, Hamburg, Germany

[21] Appl. No.: 141,962

[22] Filed: Oct. 28, 1993

[30] Foreign Application Priority Data

Jul. 31, 1992 [EP] European Pat. Off. ............ 92250199
Oct. 29, 1992 [EP] European Pat. Off. ............ 92250314

[51] Int. Cl.6 .............................................. G06F 15/00
[52] U.S. Cl. ........................................ 395/110; 395/103
[58] Field of Search ............... 395/102, 110, 117, 139, 395/150–151; 382/9, 14, 18, 47, 48, 45, 54, 55; 400/61, 63, 70, 76; 345/25, 26, 124, 127–130, 132, 141, 143–144

[56] References Cited

U.S. PATENT DOCUMENTS 4,594,732  6/1986  Tsuji ........................................ 382/9

FOREIGN PATENT DOCUMENTS 0080200A  6/1983  European Pat. Off. ............ 395/110

*Primary Examiner*—Arthur G. Evans
*Attorney, Agent, or Firm*—Nixon & Vanderhye

[57] ABSTRACT

A technique is demonstrated for the output of fonts on high resolution output devices, such as phototypesetters in particular, in which a processor unit optically scales a digitally stored font, expands/condenses and generates a desired weight of the font to be distributed. Two previously generated master fonts with varying weights in a digitized contour coding are used, by which a majority of the contours of each letter are provided with delimiting discrete control points and additionally with instructions, such as those stipulated for "Intelligent Font Scaling". The output font with the desired weight is generated through linear interpolation between the two master fonts. To optically scale to the desired point size, the output font is re-scaled with a factor to the desired point size and the instructions are applied in order to steadily vary the stroke width of the letters, linearly re-scaled with the factor, in a primary pre-set factor dependency whereby the stroke width is increased for factors smaller than 1% and decreased for factors larger than 1%. The font is typographically correctly expanded and condensed, in that the optically scaled output font is brought to the desired width through linear expansion or condensation with a second factor, whereby the instructions are applied in order to hold the stroke width constant during linear expansion or condensation of the letters and in this way to only broaden or narrow the contours.

8 Claims, 6 Drawing Sheets

- vertical straight stems
- horizontal straight stems
- vertical curve stems
- horizontal curve stems

FIG. 5

| icon | instruction | commentary |
|---|---|---|
| ▮ | stem: | observe the width of downstrokes with two straight vertical contours |
| ▬ | bar: | observe the width of horizontal strokes with two straight, horizontal contours |
| ( | bow: | observe the width of bows with two round vertical contours |
| ⌒ | arch: | observe the width of bow connections with two curved, horizontal contours |
| ⊏ | curve stem: | observe the width of vertical downstrokes each with a straight and a curved contour |
| ⌐ | curvebar: | observe the width of horizontal strokes each with a straight and a curved contour |
| ☐ | counter: | observe the width of white space (counters) |
| ||| | weight: | canonical observance of related stroke widths |
| / | slant: | observe the stroke width of slashes (diagonals) |
| ⌖ | extreme: | placement of extreme lying curve points (control points to be found lowest, highest, furthest, left or right) |
| ǁ | serif: | control of crossbar serifs or respectively components of serifs |
| ⌐| | bar serif: | control of downstroke serifs or respectively components of serifs |
| ⌷ | overhang: | use of the baseline for control of the overhang for arches |
| ▯ | tension: | straightening of flat curves with small point sizes (optima switch) |
| ⊙● | spot: | adjustment of the stroke width for devices which write in white or black |
| △ | delta: | special instructions from Apple to observe a dropout width for strokes |
| ( ) | dropout: | observe a dropout for strokes |

GENERATION OF MULTITYPE FONTS ON HIGH RESOLUTION OUTPUT DEVICES

RELATED APPLICATIONS

This application is related to my copending, commonly assigned, U.S. patent application Ser. No. 08/172,389 filed Dec. 23, 1993 (corresponding to EP 92 250199.4 filed Jul. 31, 1992).

BACKGROUND OF THE INVENTION

1. Field of the Invention

This invention concerns a technique for the output of fonts on high resolution output devices.

2. Prior Art

High resolution output devices include, for example, electronic phototypesetters or high resolution laser printers. These devices typically include a separate processor unit, which receives the text as such to be output, for example from an external computer, and with the application of digitally stored fonts converts it into a pre-set font form of particular font type and size. A margin adjustment can also be taken into consideration. Data output by the processor unit contains complete information about the font image and is fed into an interim storage, which serves to activate an output unit which transfers the data, for example with the help of a laser beam, onto a duplicating medium such as a film or paper.

In a typical computer-controlled phototypesetter technique, digitally stored fonts are provided, whereby outer line coding has caught on extensively, in which the contours or edges of a letter are described through discrete control points and connected curve elements, as displayed in FIG. 1. For example the X-, Y-co-ordinates of the start, corner, curve and tangent points are digitized as points and the curve elements are described by the various manufacturers as straight and circle, as Bezier functions, as spirals or as Spline functions. An overview of the digital font formats is to be found in the book "Digital Fonts", Peter Karow, Springer-Verlag, Berlin Heidelberg, 1992 (which is hereby incorporated by reference). Aside from the control points the letters receive so-called instructions for the definition of the outer line, which are used with the rastering for the output of the letter, for example on a laser printer or a screen, and are today above all applied by all manufacturers of digital fonts for "intelligent rastering" (Intelligent Font Scaling) (see the book "Font Technology", Peter Karow, Springer-Verlag, Berlin Heidelberg, 1992; Chapter 7 which is hereby incorporated by reference).

With exacting text designs exists the need to vary the fonts, saved in their design size, according to application purpose and design desires in the font image. Thus one may generate font size (point size) and width (alphabet length) as well as to create the desired weight. With digitally stored fonts of today, most often a master font for each font type is used and this is re-scaled according to the desired display. This technique is, however, not sufficient to obtain a typographically correct result.

Font sizes are measured in a typographical unit, which is labelled as point (pt), and it is: 1 pt=0.375 mm. The linear re-scaling of digitally stored fonts generally used today is unsatisfactory in various aspects. The font sizes manufactured through linear enlargement/reduction of a master are at the moment in their legibility and the total aesthetic impression clearly inferior to optically correct and typographically appropriate manufactured font sizes. The typographically correct "Optical Scaling", as was applied previously with the special manufacture of the different font sizes of a font type, takes into consideration that the resolution capacity of the human eye is limited. With small printed text (e.g. 5 pt) we need more space between the letters than with normal book text (e.g. 9 pt), in order that the letters do not run together and the small text remains readable. The same applies for small white counters such as in the small letter e. Very thin strokes (e.g. swash lines, so-called hair lines) need to be strengthened by the small font sizes, in order that they remain at all recognizable and don't "break through", i.e. partly disappear, already during the printing process. Conversely, if one proceeds to bigger inscriptions (advertising, placards, titles) the letters can be placed relatively closely together throughout, white counters can remain small and hair lines thin. This allows, if one starts from a master in the design size of the font, a summary in approximately the following way.

The smaller the font size,
1) therefore the wider the sentence,
2) therefore the more open the letters, and
3) therefore the thicker the stroke flow The bigger the font size,
1) therefore the narrower the sentence,
2) therefore the letters can be thinner and
3) therefore particularly the hair lines can be finer.

In the redated application EP 92250199.4, a technique for the output of fonts is proposed with which, starting from a single master font, optical scaling is automatically practicable. With the technique described there, a master font stored in a middle point size is first linearly re-scaled with a factor to the desired point size and subsequently the instructions for it are applied to steadily vary the stroke width of the letters, linearly re-scaled by the factor, in a primary pre-set factor dependency, whereby in order to achieve an optical scaling the stroke width is increased for factors smaller than 1% and is reduced for factors larger than 1%.

The problem of expansion/condensation plays a role for the typographically correct sentence. Previously this requirement could only be satisfied through the offer of expanded or respectively condensed fonts. These broader, or respectively narrower variations of a print type had to be produced through expensive hand work. Therefore for cost reasons they were not manufactured and made available for most fonts. The simple linear broadening/narrowing of letters, as is customary in many cases today in the computer-controlled phototypesetting technique, does not lead to typographically correct expanded/condensed fonts since thereby the letters are broadened or respectively narrowed in their entirety i.e. both the black letter strokes as well as the white counters in the letters and between the letters of the typeset word. For typographically correct expanded/condensed fonts the white space may be altered but not the stroke widths. In the related application EP 92250199.4 the applicant proposes a technique for the output of fonts in which, starting from a single master font, the fonts to be output are brought to the desired width through linear expansion or condensation with a factor, and subsequently the instructions for it are applied in order to hold the stroke widths constant during the linear expansion or condensation of the letters, and in this way to only broaden or narrow the counters.

In March 1991 the firm Adobe Systems, California, presented a concept called "Multiple Master", in which for the first time automatically a font display with:

Optical scaling to the desired point size

Expansion/condensation to the desired alphabet length, and

Generation of the desired weight, can be manufactured automatically in a single system. The combination of the three font varying operations (optical scaling, expansion/condensation, generation of a weight) is schematically displayed in FIG. 2. The font interpolation is displayed by means of a dice, whereby along the first axis the point size (optical scaling), along the second axis the alphabet length (expansion/condensation) and along the third axis the weight is steadily varied. The representation of a desired font is based on linear interpolation between stored master fonts with different point sizes, alphabet lengths, and weights. Consequently eight master fonts are necessary in order to be able to create a font display with the desired point size, alphabet length and weight. These eight master fonts correspond to the eight corner points of the dice displayed in FIG. 2. A grave disadvantage of this technique lies in the fact that eight raster fonts are needed, which has on the one hand as a result a high storage space requirement and on the other hand means a large time expenditure for the manufacture of the master fonts. Aside from this, the following difficulties also arise: with the manufacture of eight master fonts it is necessary to simultaneously keep the eight variations of a letter under control, i.e. all eight variants must be provided with digitized data such that they remain able to be linearly interpolated. Particular attention must be paid that in all cases the digitizing points are equal in number, type and position and that the instructions for the "Intelligent Font Scaling" are equal in number, type and parameterization. If later, for example, an improvable error in the appearance (digitizing points) or with the processing (instructions) occurs in only one letter, one must similarly correct the seven other pertinent letter variations, which in total leads to considerable time expenditure in the manufacture of the master fonts.

SUMMARY OF THE INVENTION

This invention provides a technique for the output of fonts on high resolution output devices, such as high resolution printers and electronic phototypesetters with which, starting from as small a number of digitally stored master fonts as possible, the weight, font size and alphabet length of the font to be output can be automatically typographically correctly generated.

According to the present invention a technique is demonstrated for the output of fonts on high resolution output devices, such as phototypesetters in particular, which have a processor unit, an interim storage for the font data to be output and an output unit which transfers the data accepted from the interim storage directly onto a multiplying medium, wherein the processor unit uses a plurality of the stored master fonts, each of which is stored in a digitized contour coding, in which the contours of each letter are provided with delimiting discrete control points and additionally with instructions such as those stipulated for the "Intelligent Font Scaling", wherein a font is generated for output, selected according to weight, point size and alphabet length, before the transmission to the interim storage, in that they are manufactured from the plurality of the stored master fonts through optical scaling to the desired font size, through expansion/condensation to the desired alphabet length and through generation of the desired weight. According to this invention, an output font is created with the desired weight through linear mathematical interpolation between two master fonts with different weights. Optical scaling in which the output font is re-scaled with a factor to the desired point size and the instructions for it are applied to steadily vary the stroke width of the letters, re-scaled with the linear factor, in a primary pre-set factor dependency wherein the stroke width increases for factors smaller than 1 and decreases for factors larger than 1. The desired alphabet length is generated in that the optically scaled output font is brought to the desired width through linear expansion or condensation with a second factor, wherein the instructions are applied in order to hold the stroke width constant by linear expansion or condensation of the letters and in this way to only broaden or narrow the white space, between the strokes.

With the technique according to the present invention, only two master fonts are necessary, since a linear interpolation is just carried out for the generation of the desired weight.

BRIEF DESCRIPTION OF THE DRAWINGS

The invention is illustrated by means of examples in the figures wherein:

FIGS. 4 and 5 depict descriptive elements of a font, which are defined through instructions;

DETAILED DESCRIPTION OF EXEMPLARY EMBODIMENTS

Figure 1A:
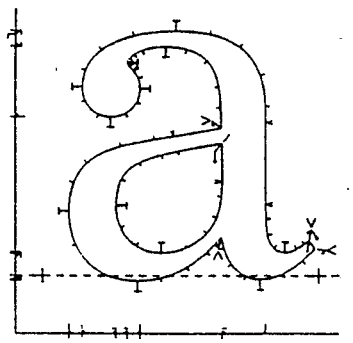
FIG. 1 depicts letters, on whose outer lines points for digital storage are displayed.
Figure 1B:
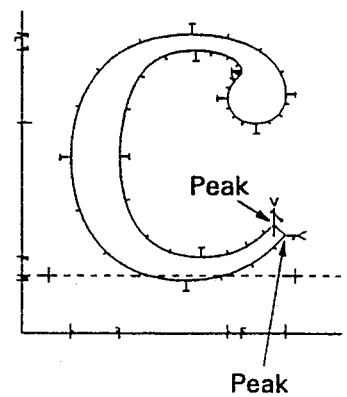
Figure 1C:
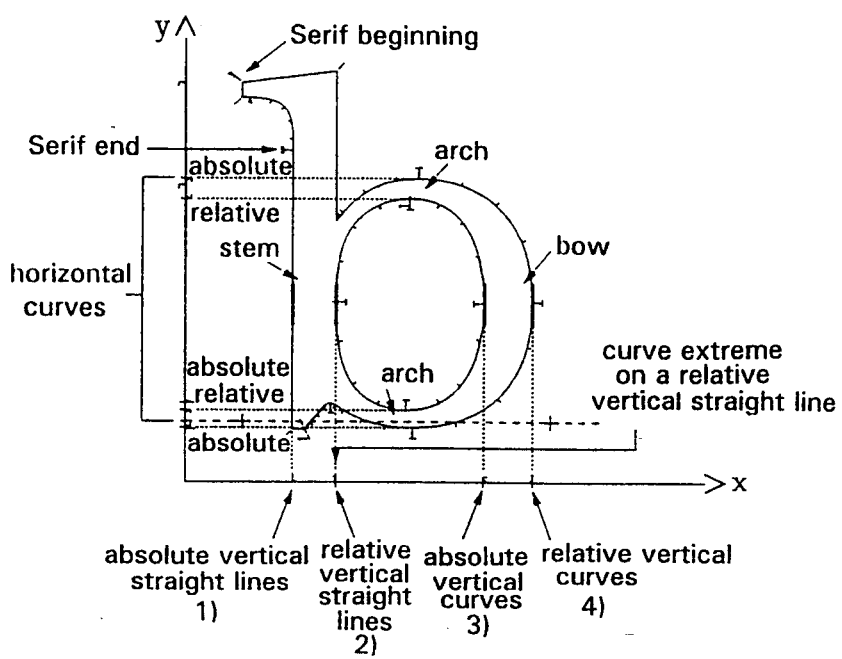
Figure 2:
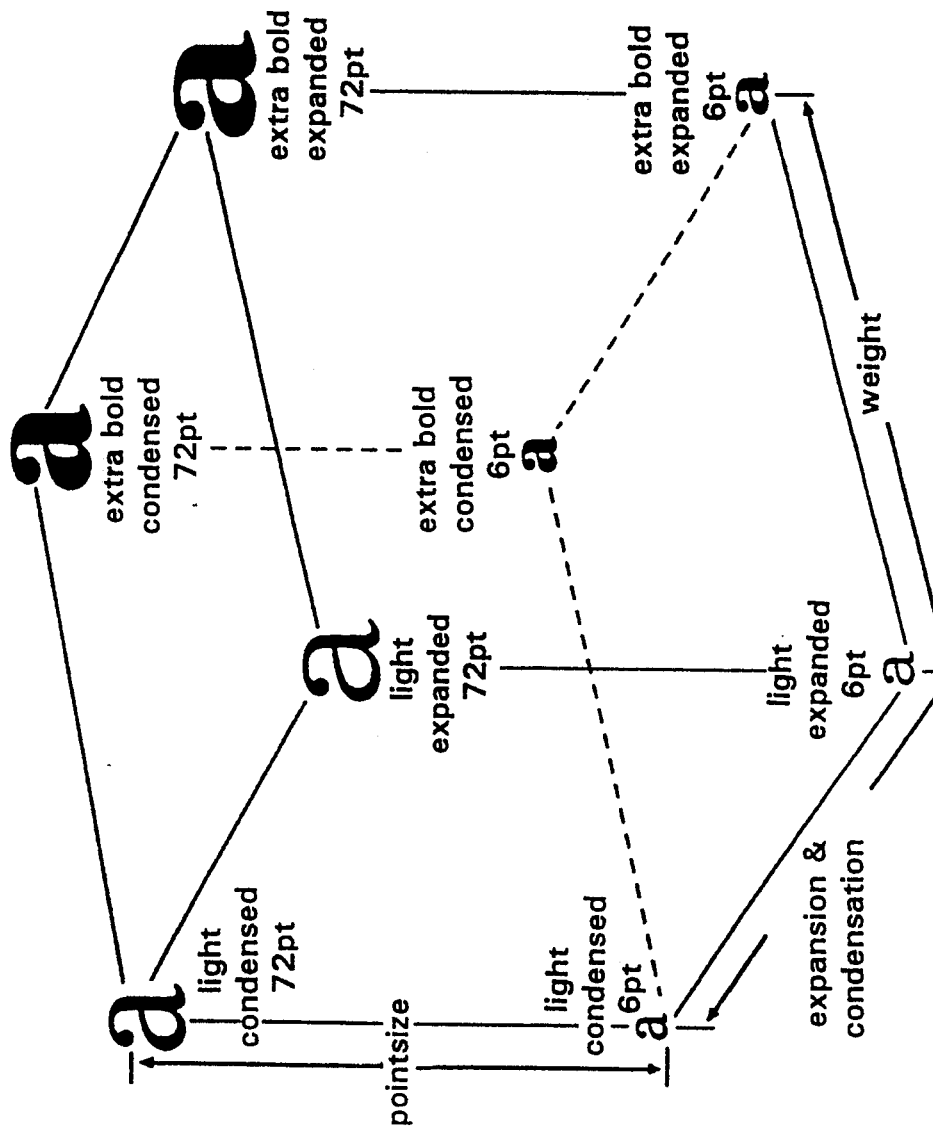
FIG. 2 is a schematic representation of the mechanism of a combined technique for font display from eight master fonts.

In FIG. 1, examples for the definition of the outer lines of a letter through discrete points are displayed; a detailed description of the current storage and technique for letter definition are to be found in the book "Digital Fonts" by Peter Karow, Springer Verlag, Berlin-Heidelberg, 1992 which is hereby incorporated by reference.

Figure 3:
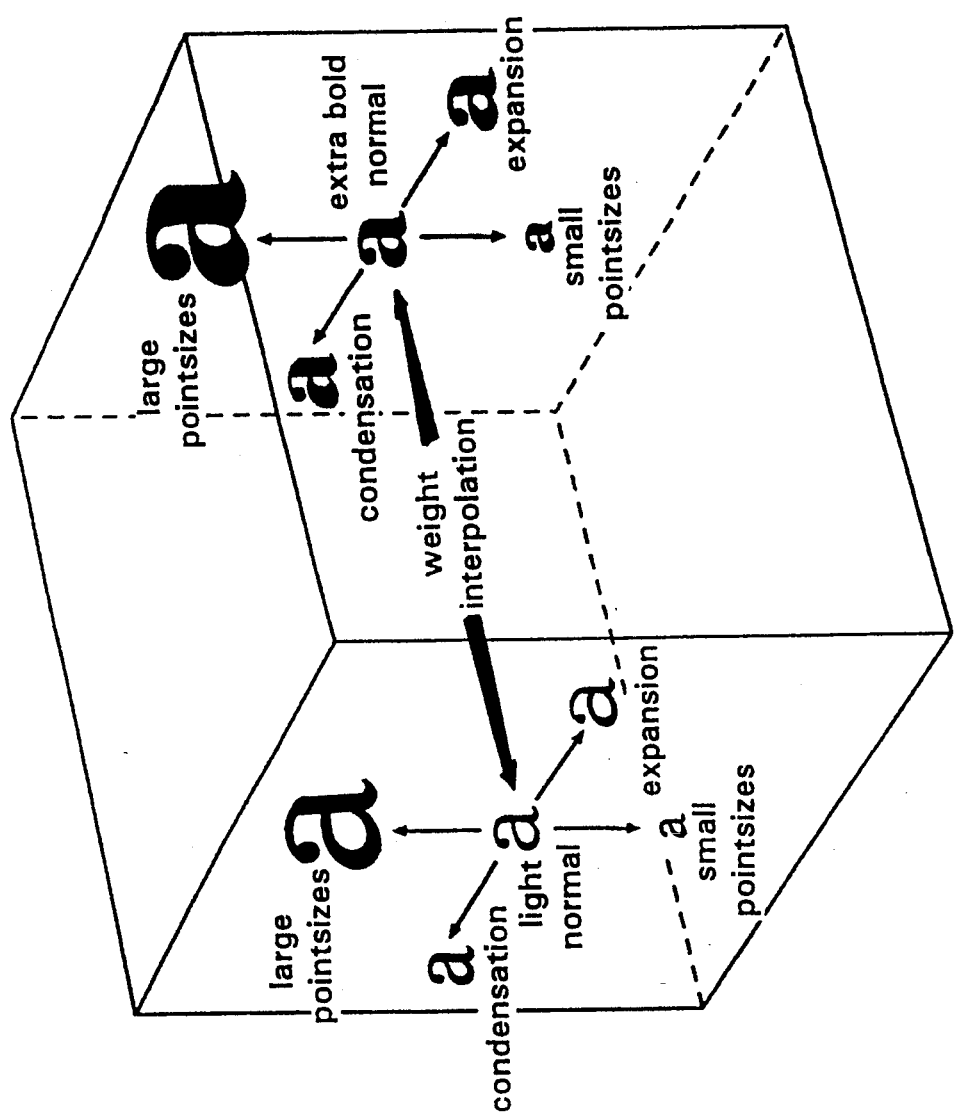
FIG. 3 is a schematic representation of the mechanism, according to the invention at issue, of the combined technique for font display from two master fonts.

With the present invention, two master fonts of medium point size and medium alphabet length are used, whereby the first shows a low weight and the second a high weight. Between these the font display with the desired weight is generated through linear interpolation. In FIG. 3, the two master fonts in the schematic representation of font generation lie in the middle of the front face and in the middle of the averted side of the dice which represents the different font displays. After generation of the desired weight, the letters, under application of the instructions, are automatically brought through optical scaling to the point size and through expansion/condensation to the desired alphabet length.

The technique for optical scaling with help from the instructions and the expansion/condensation are described in the related application EP 92250199.4 which is hereby incorporated by reference.

In the following, the meaning of the instructions in digitally stored fonts and their application by automatic optical scaling and expansion/condensation is illustrated.

Figure 4:

Aside from the points for the definition of the outer line, the letters receive so-called instructions which permit an intelligent execution of the rasterization for the output of the letters, for example on a laser printer. Instructions are also labelled "hints" or "switches". They contain firstly an identification for the type of instruction, e.g. stem; an overview of the current types of instruction is given in FIGS. 4 and 5. Additionally the instructions contain information about where the element, for example the stern, is and how wide it is. Various instructions contain under the circumstances different information for control of the rasterization. An instruction causes the important descriptive elements, such as presented in FIG. 5, of a font to be rasterized in a homogenous fashion.

For a more precise illustration a stern, a straight vertical downstroke (e.g. such as an I) can be examined. With help from the stem instructions the outline components which form the left and right limitations are automatically available. To avoid unfortunate accidents with rasterizing the left edge of the I-stem is displaced onto the nearest lying grid line. This is effected through an X-displacement which is applied to all co-ordinates of the outer line. So, no alteration in the form of the letter occurs yet. The right edge is then pushed onto the grid line which lies a particular number of grid points to the right of the left edge. This fixed number is previously determined from the general instruction type for the entire font. Thereby one starts from the middle thickness of the descriptive elements, in the present case the middle stem width, and through rounding off one ascertains the best possible number of raster points for the display of the stem width. In this way it can come to a form alteration of the I to such a degree that, after displacement of the right edge, the I has a somewhat thinner or thicker stem width. A stem width is achieved that automatically avoids accidental effects during the subsequent rasterization and that stands in harmony with the remaining font stem thicknesses. Thus the intent of the instructions and this technique is, to bring about that under compulsion one can either broaden or narrow stems, or other letter elements as well, or that these elements (such as the stem) can be pushed in a controlled fashion, e.g. altogether to the left or right. This technique, which makes a uniform rasterization of the elements in the output devices possible, is also labelled "Intelligent Font Scaling". It was thus originally invented for the avoidance of accidental rasterization on screens and laser printers at low resolution.

The instructions will henceforth be explained, in accordance to the technique of the present invention at issue, to a randomly sensitized thickening/thinning of the stroke width of letters by high resolution devices such as the phototypesetter, in order to achieve a typographically correct optical scaling in dependency on the generated point size.

A thickening, for example, of the small letter b (see FIG. 1) occurs in such a manner, that in the first two steps the two vertical stems (left stem, right bow) and then the two horizontal elements (upper and lower arch) are processed. Both steps proceed independently of one another. The first step consists of the following actions: with help from the four stem instructions (two absolute borders—(1) and (3)—and two relative borders (2) and (4)), all control points which lie to the left of border (1) are fixed. The thickening measure is added in the X-direction to the control points lying to the right of border (2). The thickening measure is added in a linearly interpolative fashion onto the control points with X-co-ordinates lying between border (1) and (2), at (1) with zero, then linearly increasing until at (2) the full value is added. Thereby the left stem is thickened. The right bow is processed in the same way. The X-co-ordinates to the left of border (3) are fixed, between (3) and (4) the thickening measure is added in a linearly interpolative fashion, to the right of (4) fully added. The two arches in the Y-direction are analogously processed.

A thinning can be achieved entirely analogously through subtraction of a thinning measure.

The expansion of the letter b occurs firstly through simple application of an X-factor to all X-co-ordinates, i.e. the X-axis (width) of the letter is extended. Thereby for the b, the stem and the bow are also broadened (thickened) by this factor. However, with the help of the old particulars for the stem borders (before the factor was applied), the original stroke width and therewith a thinning measure can be automatically ascertained.

Next, border (1) and everything lying to the left of it is fixed. Border (2) is displaced the amount of the thinning measure to the left, between (1) and (2) is displaced in a linearly interpolative fashion, and to the right of (2) is similarly displaced to the left in a linearly interpolative fashion, so that close to (2) the thinning measure is fully added and in the middle between (2) and (3) it falls to zero. Similarly with the help of the old borders (3) and (4) a thinning measure is ascertained for the bow and applied as above.

A condensation is similarly adjusted through the determination and processing of a thickening measure in the X-direction.

With the present invention, the optical scaling step is carried through in that, starting from a font which is available in a medium point size of, for example, 12 pt, each letter is re-scaled to the desired point size with a factor, and subsequently the instructions are applied in order to steadily alter the stroke width of the letters with a primary pre-set factor dependency.

Figure 6:
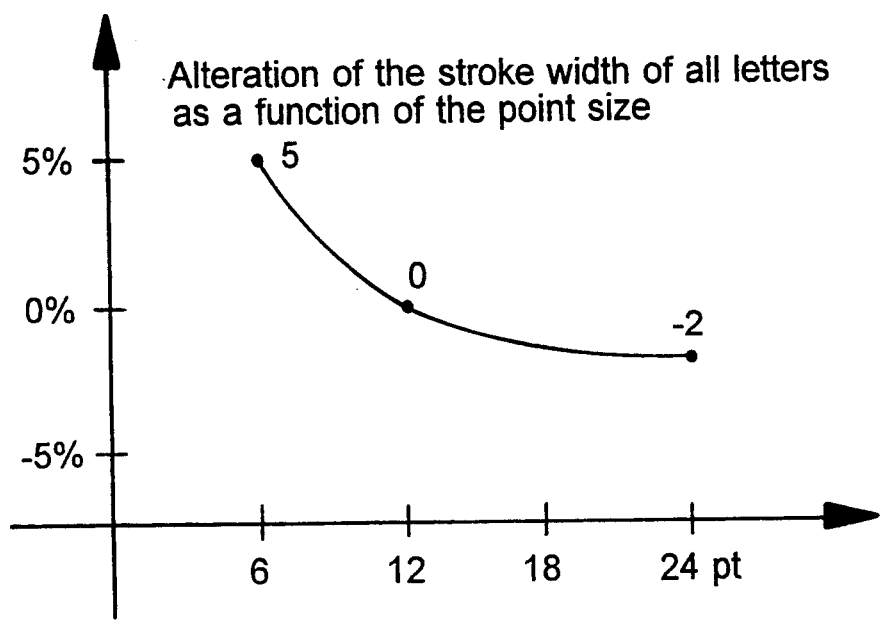
FIG. 6 depicts variations of the stroke width as a function of the point size by optical scaling.

The first pre-set dependency is displayed in FIG. 6, which shows the percentage alteration of the stroke width as a function of the point size to which it is re-scaled. The stroke width is strengthened by the transition to smaller point sizes, in this example the stroke width is increased by 5% upon the transition to the point size 6 pt, whereas upon the transition to very large letters of 24 pt it is decreased by 2%.

In a favored form of the invention, the width of the re-scaled letter is further varied in a second pre-set re-scaling factor dependency, whereby the width is increased upon the transition to smaller point sizes and is decreased upon the transition to bigger point sizes. Further, the height of the small letters is varied in a third pre-set factor dependency, whereby the height is increased upon the transition to small point sizes and is decreased upon the transition to large point sizes. According to a fourth pre-set dependency the white space can be altered in percent of the capital letter height as a function of the point size. Examples for the pre-set dependencies for the optical scaling are listed in the applicant's related application EP 92250199.4 which is hereby incorporated by reference.

Figure 7:
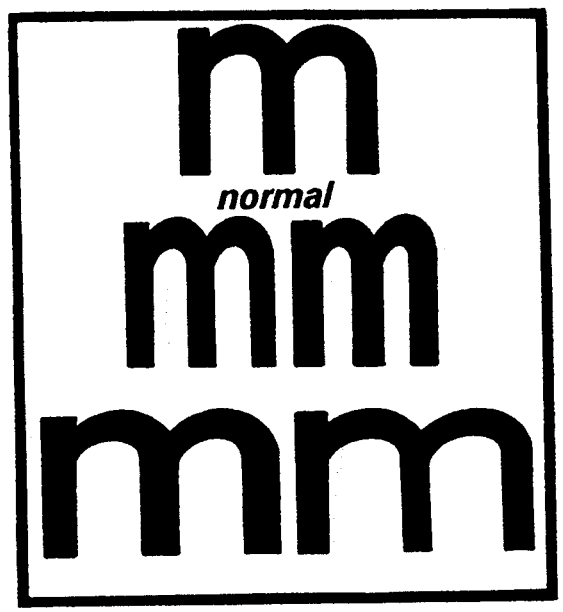
FIG. 7 depicts the contrast of linearly expanded/condensed (left) and typographically correctly expanded/condensed letters (right).

The mechanism of the typographically correct condensation/expansion in contrast to the linear is displayed in FIG. 7. The letter m on the left is simply linearly narrowed or respectively broadened in traditional fashion, in contrast to a typographically correct expansion on the right where, with the help of instructions, the stroke width is held constant and in this way only the counters of the letters are broadened or narrowed during the broadening/narrowing.

While only a few exemplary embodiments of this invention have been described in detail, those skilled in the art will recognize that many variations and modifications may be made in these embodiments while yet retaining one or many of the novel advantages associated therewith. All such variations and modifications are intended to be included within the scope of the appended claims.

What is claimed is:

1. A method of generating the output of fonts on high resolution output devices, including a processor unit, an interim storage for font data to be output and an output unit which transfers data accepted from the interim storage directly onto a multiplying medium, wherein the processor unit uses a plurality of stored master fonts, each of which is stored in a digitized contour coding in which the contours of each letter are provided with delimiting discrete control points and additionally with font scaling instructions, wherein a font is generated for output, selected according to weight, point size and alphabet length, before the stored master fonts through optical scaling to the desired font size, through expansion/condensation to the desired alphabet length and through generation of the desired weight, said method comprising the steps of:

creating an output font with the desired weight through linear mathematical interpolation between two master fonts with differing weights, effecting the optical scaling by re-scaling the output font with a factor to the desired point size and applying the instructions for it to steadily vary the stroke width of the letters re-scaled with the linear factor in a primary pre-set factor dependency wherein the stroke width is increased for factors smaller than 1 and is lessened for factors larger than 1, and generating a desired alphabet length wherein the optically scaled output fonts are brought to the desired width through linear expansion or condensation with a second factor, wherein the instructions are applied in order to hold the stroke width constant during linear expansion or condensation and in this way to only broaden or narrow the white space between the strokes (counter).

2. A method as in claim 1, wherein, by optically scaling to the desired point starting from a font of the size 12 pt, the stroke width upon re-scaling to a font size of 6 pt is increased by approximately 5% and upon re-scaling to a font size of 24 pt is reduced by approximately 2%.

3. A method as in claim 1 wherein, for optically scaling to the desired point size, the width of a linearly re-scaled letter is varied in a second pre-set factor dependency, wherein the width is increased for factors smaller than one and is reduced for factors larger than one, and that the height of the small letters is varied in a third pre-set factor dependency, wherein the height is enlarged for factors smaller than one and is reduced for factors larger than one.

4. A method as in claim 3, wherein, for optically scaling to the desired point size starting from a master font in 12 pt size, upon a linear re-scaling to a font size of 6 pt the width of the letter is increased approximately 15%, and upon a re-scaling to a point size of 24 pt it is reduced approximately 1%, and that the letter height of the small letters is increased up to 15% upon a re-scaling to a font size of 6 pt, and upon a re-scaling to a point size of 24 pt it is reduced up to 1%.

5. A method according to claim 1 wherein, for optically scaling to the desired point size, letter spaces of linearly re-scaled font is broadened by a percentage share of the capital letter height for factors smaller than one and is shortened by a percentage share of the capital letter height for factors greater than one.

6. A method as in claim 5, wherein, for optically scaling to the desired point size starting from a master font in the size 12 pt, upon re-scaling to a font size of 6 pt the letter space is broadened by approximately 6% of the capital letter height and upon re-scaling to the font size of 24 pt is shortened by approximately 4% of the capital letter height.

7. A method as in claim 1 wherein, for optically scaling to the desired point size, upon re-scaling with factors smaller than one the letters of the linearly re-scaled font are provided with a uniform outer contouring whose thickness exists in a fourth pre-set capital letter height dependency, and that a uniform inner contouring is performed upon re-scaling with factors smaller than one, whose thickness is contained in a fifth pre-set capital letter height dependency.

8. A method as in claim 7, wherein, for optically scaling to the desired point size starting from a master font in the size 12 point, upon transformation to point size 6 pt the re-scaled letters are provided with a uniformly thick outer contour of approximately 0.5% of the capital letter height, and that upon re-scaling to font size 24 pt a uniformly thick inner contour with a width of approximately 0.2% of the height of the capital letter height is provided.

* * * * *